US012691860B2

(12) United States Patent

Jundt

(10) Patent No.: US 12,691,860 B2

(45) Date of Patent: Jul. 28, 2026

(54) EQUIPMENT OF A PARTLY AUTONOMOUSLY OR AUTONOMOUSLY OPERATED MOTOR VEHICLE

(71) Applicant: KNORR-BREMSE Systeme für Nutzfahrzeuge GmbH, Munich (DE)

(72) Inventor: Oliver Jundt, Hessigheim (DE)

(73) Assignee: KNORR-BREMSE Systeme für Nutzfahrzeuge GmbH, Munich (DE)

( * ) Notice: Subject to any disclaimer, the term of this patent is extended or adjusted under 35 U.S.C. 154(b) by 11 days.

(21) Appl. No.: 18/994,922

(22) PCT Filed: Jul. 3, 2023

(86) PCT No.: PCT/EP2023/068205

§ 371 (c)(1),
(2) Date: Jan. 15, 2025

(87) PCT Pub. No.: WO2024/017608

PCT Pub. Date: Jan. 25, 2024

(65) Prior Publication Data

US 2026/0034973 A1      Feb. 5, 2026

(30) Foreign Application Priority Data

Jul. 19, 2022    (DE) .......................... 102022118023.9

(51) Int. Cl.
| | |
|---|---|
| B60T 13/74 | (2006.01) |
| B60T 17/22 | (2006.01) |
| B60W 30/18 | (2012.01) |

(52) U.S. Cl.
CPC .............. B60T 13/74 (2013.01); B60T 17/22 (2013.01); B60W 30/18027 (2013.01); B60T 2270/414 (2013.01)

(58) Field of Classification Search
CPC .... B60T 13/74; B60T 17/22; B60T 2270/414; B60T 2201/06; B60T 2270/402; B60T 13/662; B60W 30/18027
See application file for complete search history.

(56) References Cited

U.S. PATENT DOCUMENTS

| | | | |
|---|---|---|---|
| 9,802,612 | B2 | 10/2017 | Ogata et al. |
| 2003/0233179 | A1 | 12/2003 | Matsubara et al. |
| 2007/0010927 | A1* | 1/2007 | Rowley ........... B60W 30/18036 |
| | | | 701/54 |

FOREIGN PATENT DOCUMENTS

| | | |
|---|---|---|
| JP | 2004359169 A | 12/2004 |
| JP | 2021104780 A | 7/2021 |

* cited by examiner

*Primary Examiner* — Long T Tran
*Assistant Examiner* — Charles J Brauch
(74) *Attorney, Agent, or Firm* — Greenberg Traurig, LLP; Ryan D. Sharp

(57) ABSTRACT

This disclosure relates to equipment of a partly autonomously or autonomously operated motor vehicle. The equipment includes an electrically actuating service brake device which carries out at least one service brake function, an electrically actuating parking brake device which has at least one applied state and a released state, a drive device which has at least one active state for driving the motor vehicle and an inactive state, a starter device which produces a starting signal which transfers the drive device from the inactive state into the active state, and an electrical energy source. This disclosure also relates to an electronic control device which is in signal connection with the parking brake device and the starter device.

15 Claims, 4 Drawing Sheets

EQUIPMENT OF A PARTLY AUTONOMOUSLY OR AUTONOMOUSLY OPERATED MOTOR VEHICLE

CROSS-REFERENCE TO RELATED APPLICATIONS

This is a 371 national stage application claiming priority to international patent application Serial No.: PCT/EP2023/068205 filed on Jul. 3, 2023, which claims priority to German Patent Application No. 102022118023.9, filed Jul. 19, 2022, the disclosures of which are incorporated by reference herein in their entirety.

DESCRIPTION

The invention relates to a set of equipment of a partially autonomously or autonomously operated motor vehicle, according to the preamble of claim 1. The invention furthermore relates to a partially autonomously or autonomously operated motor vehicle having such a set of equipment, according to claim 15.

Such a set of equipment is described for example in the as yet unpublished German patent application with the file reference 10 2021 114 055.2. The electrical set of equipment comprises an electropneumatic service brake device having a primary service brake circuit and a redundant service brake circuit, wherein, within the redundancy service brake circuit, in response to an assistance braking demand signal from an assistance system and irrespective of a defect in the primary service brake circuit, at least one pneumatic brake control pressure is modulated immediately and directly to the electromagnetic backup valve, which is (still) closed owing to electrical energization, of at least one pressure control module. Then, in the event of a failure of the primary service brake circuit, the then electrically deenergized electromagnetic backup valve of the at least one pressure control module automatically opens, and the brake pressure is immediately generated in the pressure control module in question on the basis of, or in a manner dependent on, the pneumatic brake control pressure already prevailing there.

In the case of utility vehicles powered in particular (or else additionally) by internal combustion engines, an excessively low supply voltage can occur for a certain period of time (for example for several seconds) immediately after an initiation of the starting of the engine (cranking) by a starter device such as a cranking motor. This is caused by a high current demand of the cranking motor, the internal resistance of the starter battery, and the fact that the alternator is not providing an (effective) current.

Low temperatures or an old starter battery can exacerbate the effect.

Electropneumatic service brake devices having a primary electrically actuated service brake circuit and a redundant service brake circuit as described above then automatically switch from the primary service brake circuit to the redundant service brake circuit when the electrical supply voltage undershoots a supply voltage minimum value; for example, in the electropneumatic service brake device described above, this switch occurs by virtue of the backup valves integrated into the pressure control module immediately opening. In such a case, the supply voltage is no longer sufficient to provide an adequate supply to the electrical components of the primary electrically actuated service brake circuit in order that it can perform the service brake function.

If the motor vehicle has a brake actuating element such as a footbrake valve, by means of which the driver can for example purely pneumatically actuate the redundant service brake circuit, it remains possible for the driver to perform redundant braking by way of the redundant pneumatic brake circuit. In the case of partially autonomously or autonomously operated motor vehicles, in which there is no longer a need for the driver to actively control the motor vehicle, actuation of the redundant brake circuit may consequently not occur. Then, in the event of an (in particular temporarily) excessively low supply voltage and an associated failure of the primary brake circuit, and if no active actuation of the redundancy service brake circuit is performed by the driver, there is the risk of the parked motor vehicle rolling away if no parking brake is engaged. This risk is particularly high if the motor vehicle is standing on a slope.

The invention is based on the object of providing a set of equipment of a partially autonomously or autonomously operated motor vehicle, which set of equipment provides a high level of safety against unintended movement of the motor vehicle. It is furthermore sought to provide a motor vehicle having such a set of equipment.

Said object is achieved according to the invention by means of the features of claims 1 and 15.

DISCLOSURE OF THE INVENTION

The invention proceeds from a set of equipment of a partially autonomously or autonomously operated motor vehicle, which set of equipment comprises at least the following:

a) an electrically actuatable service brake device that performs at least one service brake function, b) an electrically actuatable parking brake device that performs at least one parking brake function and has at least one applied state and a released state, c) a drive device that has at least one active state for driving the motor vehicle and an inactive state in which the drive device is shut down, d) a starter device which generates a starting signal S which transfers the drive device from the inactive state into the active state, and e) an electrical energy source which supplies electrical energy to at least the electrically actuatable service brake device and the starter device.

The electrically actuatable service brake device may for example be an electropneumatic, an electrohydraulic, an electromechanical or a purely electrical service brake device. The electrically actuatable parking brake device may likewise be an electropneumatic, an electrohydraulic, an electromechanical or a purely electrical parking brake device. The drive device may comprise an internal combustion engine and/or an electric machine. The starter device that generates the starting signal may comprise a control unit for partially autonomously or autonomously controlling the motor vehicle and/or an ignition switch that can be manually operated by a driver of the motor vehicle.

The electrical energy source that supplies the electrical supply voltage to at least the electrically actuatable service brake device and the starter device may for example comprise an on-board battery and/or an on-board accumulator, optionally also a primary electrical energy source, and additionally a redundant electrical energy source.

The starting signal S generated by the starter device is preferably an "engine start" signal for activating or starting the drive device or a drive engine of the drive device, in particular an internal combustion engine of the motor vehicle. Alternatively or in addition, the starting signal S may transfer at least one device of the set of equipment of the motor vehicle, in particular the electrically actuatable service brake device and/or the electrically actuatable parking brake device, from an electrically deenergized state or a "sleeping" state into an electrically energized state or "woken" state. Then, the starting signal S for example (also) comprises an "ignition on" signal.

A partially autonomously operated motor vehicle means that the driver is assisted in controlling the vehicle (longitudinal dynamics, lateral dynamics) by a driver assistance system which then autonomously or automatically intervenes for example in the steering system, in the drive device and/or in the service brake device and/or in the parking brake device in order, for example, to move the vehicle along a particular trajectory during travel and/or to immobilize the vehicle when at a standstill. Here, the driver must assist the driver assistance system. An autonomously operated motor vehicle means that an autonomous system such as an autopilot performs the (entirety of the) control of the vehicle (longitudinal dynamics, lateral dynamics) without the aid of the driver. A problem can arise here if, proceeding from a situation in which a motor vehicle is parked by means of the parking brake device, the starter device is actuated in order to commence driving. Since both the service brake device and the starter device are normally supplied with electrical energy by the same electrical energy source, there is the risk of a drop in the supply voltage U occurring owing to the actuation of the starter device during the starting operation, which drop may be so great that the electrically actuated service brake device is no longer functional. The driver does then have the option, by actuating the footbrake pedal, to brake the motor vehicle if it unintentionally rolls away. The driver, relying on the partially autonomous/autonomous functions of the motor vehicle, or else failing to pay attention, may however neglect to do so. The invention uses this problem as motivation to offer an improvement.

According to the invention, f) an electronic control device is provided which has a signal connection to at least the parking brake device and the starter device and which receives from a sensor device an actual value for an electrical supply voltage $U_{ist}$ or a physical variable, representing said actual value, of the electrical energy source, wherein g) the electronic control device is designed to be able to determine with the aid of the signal connection whether the parking brake device is in the applied state, optionally the drive device is in the inactive state, and the starter device has generated the starting signal S, and if this is the case, the electronic control device keeps the parking brake device in the applied state for as long as the actual value for the electrical supply voltage $U_{ist}$, or the physical variable representing said actual value, has not reached or overshot a supply voltage minimum value $U_{min}$.

To determine whether the actual value for the electrical supply voltage $U_{ist}$, or the physical variable representing said actual value, has reached or overshot the supply voltage minimum value $U_{min}$, the set of equipment therefore comprises the sensor device, which for example inputs a variable representing the actual value of the supply voltage $U_{ist}$ as a sensor signal into the electronic control device. Said variable may be measured directly as an actual voltage value, or else may be derived or calculated from another measured physical variable. The sensor device may, like the electronic control device, be connected to the signal connection in order to input the sensor signal from the sensor device into the electronic control device. The actual value of the supply voltage $U_{ist}$ is preferably determined or measured at least at the time to at which the starting signal S is generated by the starter device.

The purpose or effect of these measures is that, in the event that the service brake device is undersupplied by the supply voltage U of the energy source and is then not functional, the fact that the parking brake device continues to be kept in the applied state means that the motor vehicle is then prevented from unintentionally rolling away if the driver, for example failing to pay attention, does not intervene. The operational safety of the motor vehicle is thus increased.

However, when the electrical supply voltage U has (again) reached or overshot the supply voltage minimum value $U_{min}$, in particular shortly after the starting of the drive device, the service brake device is fully functional again, such that the parking brake device is then preferably switched by the electronic control device from the applied state into the released state, and the motor vehicle can commence driving. The supply voltage minimum value $U_{min}$ therefore preferably represents a minimum level with regard to the functionality of the service brake device; that is to say, the electrical energy source must deliver at least the supply voltage minimum value $U_{min}$ in order for the service brake device to be functional or made functional.

In other words, the electronic control device is designed such that, if the starter device has generated the starting signal S at the time to and the parking brake device is in the applied state, in particular when the motor vehicle is at a standstill, the parking brake device is transferred from the applied state into the released state if said electronic control device has determined in particular with the aid of the signal connection that the actual value for the electrical supply voltage $U_{ist}$ has overshot the supply voltage minimum value $U_{min}$ in particular for at least the duration of a predetermined first time period $\Delta t_1$, for example 2 seconds. It is then to be assumed that the supply voltage U is stable (again) and no longer falls below the supply voltage minimum value $U_{min}$.

Advantageous refinements of and improvements to the invention set out in claim 1 are possible by means of the measures specified in the dependent claims.

The electronic control device is particularly preferably designed to keep the parking brake in the applied state for as long as the actual value for the electrical supply voltage $U_{ist}$, or the physical variable representing said actual value, has not reached or overshot the supply voltage minimum value $U_{min}$ for at least the duration of a predetermined first period of time $\Delta t_1$. For example, the predetermined first period of time $\Delta t_1$ may begin upon the generation of the starting signal S at the time to, and may for example last at least 2 seconds. Instead of being defined or predetermined, the first period of time $\Delta t_1$ may also be variable.

The electronic control device may also be designed to transfer the parking brake device from the applied state into the released state when it has determined that the actual value for the electrical supply voltage $U_{ist}$, or the physical variable representing said actual value, has overshot the supply voltage minimum value $U_{min}$ (again) in particular for at least the duration of the first predetermined period of time $\Delta t_1$.

The electrically actuatable service brake device particularly preferably has a primary service brake circuit and at least one redundant service brake circuit as redundancy for the primary service brake circuit, wherein the electrically actuatable service brake device is designed such that, in the normal state, the primary service brake circuit performs the service brake function(s), but in response to a switching criterion, the performance of at least a part of the service brake function(s) switches from the primary service brake circuit to the redundant service brake circuit. The at least one redundant brake circuit may also comprise a parking brake circuit or be formed by a parking brake circuit, for example if this can be used, in the event that the primary service brake circuit has developed a fault, to brake the motor vehicle from a traveling state to a standstill and then hold it at a standstill.

It can be a problem here that the service brake function(s) that can be performed by the redundant service brake circuit are at least degraded relative to the service brake function(s) that can be performed by the primary service brake circuit, in particular with regard to higher-level functions such as driving dynamics control (ABS, ASR, ESP etc.). This may be the case for example if the service brake function of the redundant service brake circuit can only implement axle-specific ABS, whereas the service brake function of the primary service brake circuit can implement wheel-specific ABS. For example, it is then desirable for a switch to be made from the primary service brake circuit to the redundant service brake circuit only if such a switch is actually necessary, for example only in the event of a relatively long-lasting drop in the supply voltage, which then for example lasts longer than the predetermined first period of time $\Delta t_1$. Depending on the design of the electrically actuatable service brake device, it is also possible for a switch from the redundant service brake circuit back to the primary brake circuit to be prevented, even if the switching criterion is no longer present after a certain period of time.

If, for example, as described above, the switching criterion comprises the event in which the supply voltage U is or becomes lower than the supply voltage minimum value $U_{min}$, this event generally occurs only for a short period of time, for example if, as described above, the supply voltage U briefly drops owing to the starting of an internal combustion engine of the motor vehicle, but returns to being equal to or higher than the supply voltage minimum value $U_{min}$ shortly after the starting operation. In such case, a switch from the primary service brake circuit to the redundant service brake circuit, and a degradation of the service brake function(s) that is under certain circumstances associated with such a switch, would not be necessary, because then, after the short period of time of the starting operation and of the associated drop in the supply voltage, the supply voltage U returns to being high enough to be able to fully perform the service brake function(s) of the primary service brake circuit unimpaired.

Against this background, the electronic control device is preferably designed to prevent, in response to the switching criterion coming into effect, a switch of the performance of the service brake function(s) from the primary service brake circuit to the redundant service brake circuit, and to disregard the switching criterion if the actual value for the supply voltage $U_{ist}$, or the physical variable representing the actual value, is lower than the supply voltage minimum value $U_{min}$ for at most the duration of a predetermined second period of time $\Delta t_2$. For example, the predetermined second period of time $\Delta t_2$ may begin upon the generation of the starting signal S at the time to. Instead of being defined or predetermined, the second period of time $\Delta t_2$ may also be variable.

In one refinement, the electronic control device may be a "stand-alone" control unit or may be integrated in any electronic control unit, for example in a service brake control unit for controlling the service brake device, in a parking brake control unit for controlling the parking brake device, and/or in a control unit for partially autonomously or autonomously controlling the motor vehicle.

The signal connection may also comprise at least one controller area network (CAN). Alternatively or in addition, the signal connection may also comprise or include an internal signal connection, for example within an integrated control unit.

The starter device that generates the starting signal S may preferably a) comprise a control unit for partially autonomously or autonomously controlling the motor vehicle, and/or b) comprise an ignition switch that can be a manually operated by a driver of the motor vehicle.

Case a) comprises in particular the case in which the motor vehicle or its drive device is automatically started by the control unit for partially autonomous or autonomous control of the motor vehicle, for example after the autopilot has been activated by the driver and a destination has been specified for the autopilot.

The electrical energy source may supply electrical energy not only to the electrically actuatable service brake device and to the starter device but also to the electrically actuatable parking brake and/or to the electronic control device. Alternatively, it is also possible for electrical energy to be supplied to each of these devices by a redundant or additional electrical energy source. In particular, electrical energy may be supplied to the electronic control device by a secondary energy source which is additional to and independent of the electrical energy source, in order that said electronic control device can reliably perform the above-described function.

If the electrically actuatable parking brake device comprises, as a parking brake actuator, at least one (passive) spring brake cylinder which is applied when ventilated and released when pressurized, then the parking brake device can advantageously be kept in the applied state even in the event of an above-described drop in the supply voltage owing to a starting operation because no electrical energy is required to do this, because the relaxed accumulator spring continues to keep the parking brake applied. In particular, the parking brake then does not need to be electrically energized in order to be kept in the applied state.

To release the spring brake cylinders under the aforementioned conditions, that is to say if the actual value of the supply voltage U, or the physical variable representing said actual value, has reached or overshot the supply voltage minimum value $U_{min}$ in particular for at least the duration of the first predetermined period of time $\Delta t_1$, then sufficient supply voltage is available to pressurize and thus release the spring brake cylinders.

The invention also relates to a partially autonomously or autonomously operated motor vehicle that has an above-described set of equipment.

Further measures that improve the invention will be presented in more detail below together with the description of exemplary embodiment of the invention on the basis of the drawing.

DRAWING

A preferred exemplary embodiment of the invention is illustrated in the drawing and will be discussed in more detail in the following description. In the drawing.

DESCRIPTION OF THE EXEMPLARY EMBODIMENT

Figure 1:
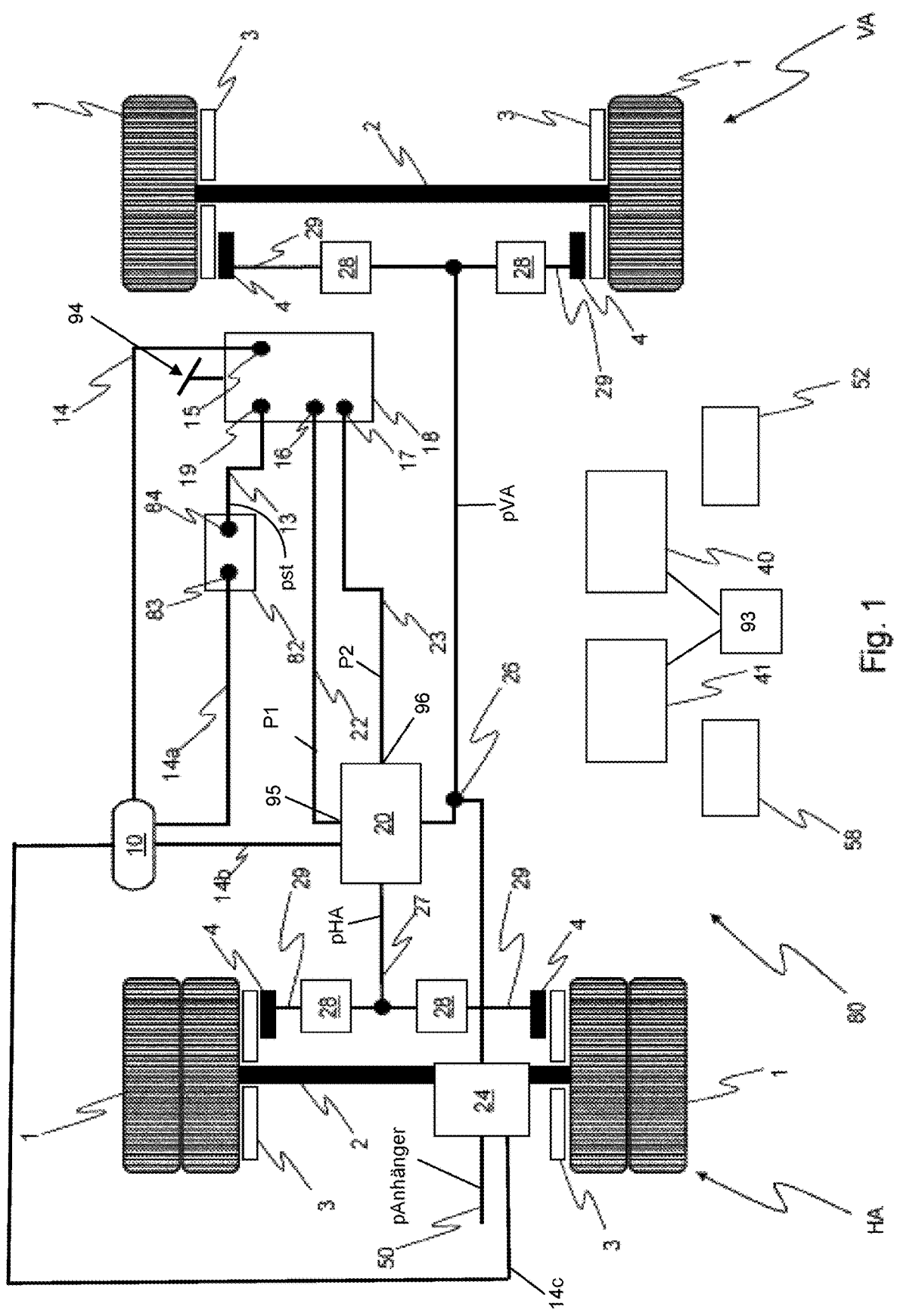
FIG. 1 is a schematic circuit diagram, showing pneumatic connections, of a preferred embodiment of a part of a set of equipment of a motor vehicle according to the invention.
Figure 2:
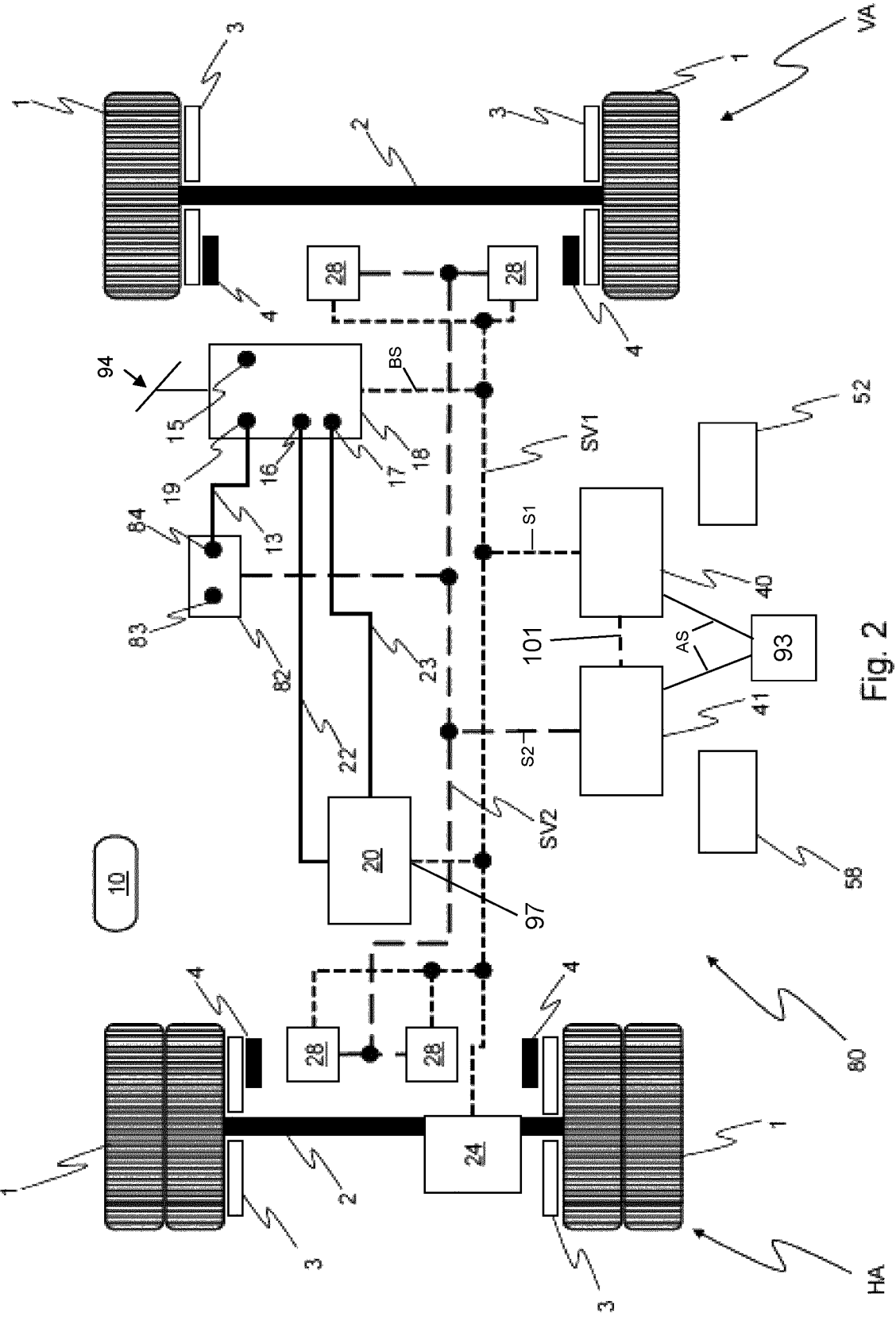
FIG. 2 is a schematic circuit diagram, showing electrical connections and some pneumatic connections, of a part of the set of equipment of FIG. 1.

FIG. 1 is a schematic circuit diagram, showing pneumatic connections, of a preferred embodiment of an electrical set of equipment of a motor vehicle according to the invention, having an electropneumatic service brake device 80, and FIG. 2 is a schematic circuit diagram, showing electrical connections and some pneumatic connections, of the electrical set of equipment of FIG. 1. The following description of the electrical set of equipment relates to both figures.

A front axle VA and a rear axle HA of the motor vehicle are shown, each of which has wheels 1 that are fastened rotatably on an axle 2. Each of the wheels 1 is assigned a pneumatic wheel brake actuator 4; in the example shown, said pneumatic wheel brake actuators are designed as service brake cylinders at the front axle VA and as pneumatic combination cylinders, composed of a service brake cylinder and a spring brake cylinder, at the rear axle HA. Such a pneumatic wheel brake actuator 4 is arranged at each wheel 1 and, in this case, by way of example, actuates a disk brake 3 in order to generate a braking force.

To perform a service braking operation, a brake pressure a brake pressure $p_{VA}$ or $p_{HA}$ respectively is applied to each of the service brake cylinders of the pneumatic wheel brake actuators 4, whereby a friction force is generated in the disk brake 3, resulting in a braking moment. Rotational speed sensors (not shown) are also provided at the wheels 1 in order to detect rotational speeds of individual wheels 1 and process same in higher-level functions such as ABS, ASR or ESP.

For the sake of clarity, further components of the motor vehicle, and in particular the axle structural design and the structural design of the brakes, have been omitted from the illustration. Such a brake structural design and vehicle structural design are furthermore not to be regarded as limiting the subject matter of the invention. These serve merely as an example for illustrating the mode of operation of the subject matter according to the invention. Alternative possible structural designs of an electropneumatic service brake device are rather also conceivable, such as drum brakes instead of the disk brakes 3 that are shown. Other embodiments of a motor vehicle are also conceivable. For example, more than one front or rear axle VA, HA, that is to say more than two axles overall, could be provided.

The electropneumatic service brake device 80 will be described below. This has a compressed-air reservoir 10, which supplies compressed air to various components 18, 20, 24, 82 of the electropneumatic service brake device 80 via supply lines 14, 14a, 14b, 14c.

Figure 3:
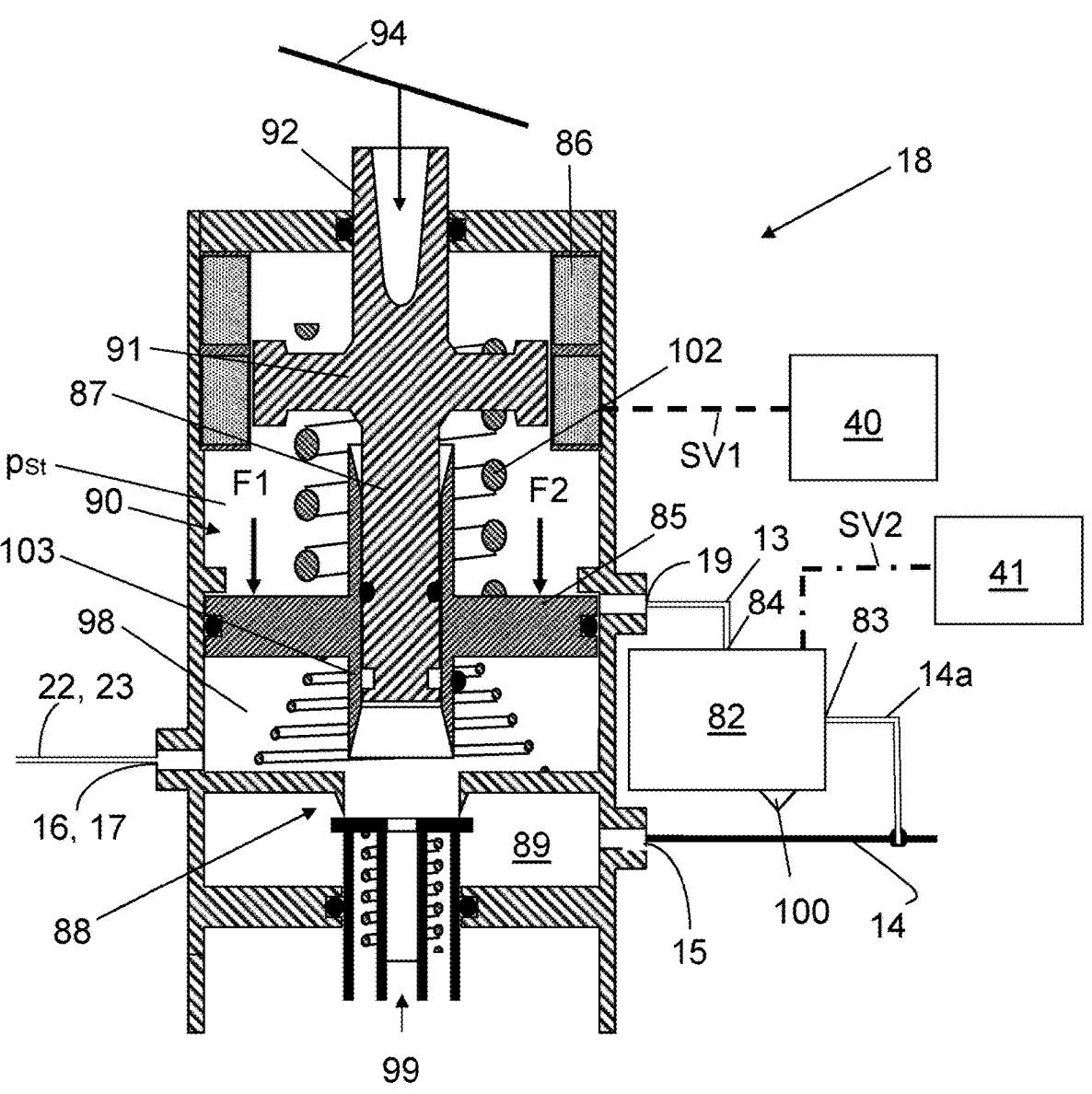
FIG. 3 is a schematic cross-sectional illustration of a service brake valve device of an electropneumatic service brake device of the set of equipment of FIG. 1 and FIG. 2 according to a preferred embodiment, in a "driving" position.

One component is an electropneumatic service brake valve device 18, in this case for example in the form of a footbrake module, which is shown schematically in FIG. 3 and which is connected to the supply line 14 via a supply inlet 15. Compressed air is supplied to the service brake valve device 18 via said supply inlet. The service brake valve device 18 furthermore has a pneumatic control inlet 19 via which it can receive a pneumatic control pressure $p_{St}$ with which the service brake valve device 18 is then pneumatically controlled. The service brake valve device 18 furthermore has two pneumatic control outlets 16, 17 via which it can modulate a first pneumatic brake control pressure $p_1$ and/or a second pneumatic brake control pressure $p_2$ in pneumatic control lines 22, 23.

The service brake valve device 18 furthermore has a service brake actuating element 94 such as a brake pedal, by means of which braking demands can be input by a driver. The service brake valve device 18 is designed to detect, by means of an in particular electrical and contactlessly operating braking value transmitter 86 within the electrical channel thereof, as shown in FIG. 3, a braking demand made by a driver, and to input same as an electrical actuation signal BS, which is dependent on an actuation, into a primary control connection SV1, as shown in FIG. 2. Via the primary control connection SV1, the electrical actuation signal BS is then input into a primary electronic brake control device 40, which in this case is formed for example by the electronic EBS control unit. Depending on the actuation signal BS, the primary electronic brake control device 40 then generates a first electrical braking demand signal S1, in which higher-level functions such as an axle-load-dependent brake force distribution are also taken into account. The first electrical braking demand signal S1 may thus differ for the front axle VA and rear axle HA, or is generated on an axle-specific basis.

The service brake valve device 18 has a housing in which a plunger piston 91 having a plunger receptacle 92 which projects through a cover opening of a housing cover is axially movably received. A plunger (not shown here) projects from above into the plunger receptacle 92, said plunger being connected to the service brake actuating element 94, in this case for example in the form of a footbrake plate. Therefore, if the driver actuates the service brake actuating element 94, the plunger pushes into the plunger receptacle 92, and the plunger piston 91 is moved downward in FIG. 3, as indicated by the arrow therein, by the actuation force. The plunger piston 91 transmits the actuation force, preferably via a plunger piston compression spring 102, to a control piston 85 that is likewise mounted axially movably in the housing 2.

Furthermore, the control piston 85 is mechanically operatively connected via a plunger piston rod 87 to the plunger piston 91, wherein the plunger piston rod 87 is connected to the plunger piston 91 and can make axially abutting contact in an end, formed as a cup-shaped sleeve 103, of the control piston 85 if the plunger piston rod 87 has reached the base of the sleeve 103, for example if the plunger piston 91 is moved toward the control piston 85 as a result of an actuation of the service brake actuating element 94. On the other hand, the plunger piston rod 87 can slide in the sleeve 103 if the plunger piston 91 is moved away from the control piston 85.

On the other side of the control piston 85, an outlet seat of a double seat valve 88 is formed on a piston rod of the control piston 85, which outlet seat seals against a cup-shaped and hollow valve body, mounted axially movably in the housing, of the double seat valve 88 or is lifted from said valve body, opening up a flow cross section between a working chamber 98 and a head-side passage opening in the valve body, which passage opening leads to a ventilation port 99. The working chamber 98 is connected to the control outlets 16, 17, and these are connected to the control lines 22, 23, which in turn are connected to the pneumatic control inlets 95, 96 of a pressure control module 20. For simplicity, the control outlets 16, 17 have been shown as one port in the drawing, whereas in reality two separate control outlets 16, 17 are provided.

In the service brake valve device 18, a control chamber 90 is formed between the plunger piston 91 and that surface of the control piston 85 which faces toward said plunger piston. Here, the pneumatic control inlet 19 on the housing opens into the control chamber 90.

The control line 13 and thus also the control outlet 84 of a solenoid valve device 82 are connected to the pneumatic control inlet 19, and said solenoid valve device is connected at its supply inlet 83 to the supply line 14*a* that is connected to a compressed-air reservoir 10. Also provided on the housing of the service brake valve device 18 is the supply inlet 15, to which the supply line 14 is connected and which is connected to a reservoir chamber 89 of the service brake valve device 18.

The valve body is forced, by means of a valve body compression spring supported on the base of the housing and on the inside of the valve body, against an inlet seat of the double seat valve 88, said inlet seat being formed on a radially inner edge of a central passage bore of a further inner wall of the housing. In the state in which the valve body has been lifted off from the inlet seat counter to the action of the valve body compression spring, a flow cross section is opened up between the supply inlet 15, or the reservoir chamber 89, and the working chamber 98, which flow cross section allows a flow of compressed air at reservoir pressure to enter the control outlets 16, 17, that is to say the control lines 22, 23, in order to pressurize the wheel brake actuators 4 of the associated axle or of the associated brake circuit, front-axle brake circuit and rear-axle brake circuit.

FIG. 3 shows the "driving" position of the service brake valve device 18, in which the outlet seat has been lifted off from the valve body, and the control outlets 16, 17 and thus also the wheel brake actuators 4 connected thereto have been connected to the ventilation port 99. The active pneumatic wheel brake actuators 4 have thus been released.

A pressure control module 20 according to FIG. 1 and FIG. 2 is well known, for example from page 763, in particular figure E, of the "Automotive Handbook", 24th edition, April 2002, from Robert Bosch GmbH. The pressure control module 20, which is for example of two-channel configuration in this case, comprises, for each channel (in this case for example front-axle channel and rear-axle channel), an electromagnetic backup valve which is controlled in this case by the primary electronic brake control device 40, with a backup valve being connected to each pneumatic control inlet 95, 96. At the outlet side, the backup valve is connected to a pneumatic control inlet of an integrated relay valve. When electrically energized by the primary electronic brake control device 40, that is to say in the case of an intact electrical service brake circuit, such a backup valve switches into its shut-off position, and thus retains a pneumatic brake control pressure prevailing at said backup valve. When electrically energized, the backup valve switches into its pass-through position, whereby the pneumatic brake control pressure can act on the relay valve, which thereupon boosts the flow rate of the pneumatic brake control pressure on the basis of the reservoir pressure input into the pressure control module 20 from the compressed-air reservoir 10, and then modulates said pneumatic brake control pressure as a front-axle pressure $p_{VA}$ and a rear-axle brake pressure $p_{HA}$ at pressure outlets of the pressure control module 20 into lines 26, 27 that are connected via pressure control valves 28 to the wheel brake actuators 4. The pressure control valves 28 are preferably connected to the primary control connection SV1 and to a secondary control connection SV2.

The pressure control module 20 additionally comprises an inlet-outlet solenoid valve combination which is controlled by an integrated electronic pressure control module control unit and which is connected at the outlet side to the pneumatic control inlet of the relay valve. Thus, either the pneumatic brake control pressure passed through the electrically deenergized backup valve, or the pneumatic brake control pressure generated by electric means through the control of the inlet/outlet solenoid valve combination by means of the integrated electronic pressure control module control unit, can be applied to the relay valve. The pressure control module control unit is connected via an electrical control inlet 97 to the primary control connection SV1, to which the primary electronic brake control device 40 is also connected, whereby the pressure control module control unit can be controlled, or supplied with control signals, by the primary electronic brake control device 40.

Also integrated in such a pressure control module 20 is a pressure sensor for measuring the actual brake pressure $p_{VA}$ or $p_{HA}$ modulated by the relay valve. The actual brake pressure measured by the pressure sensor is then compared with a setpoint brake pressure in the context of closed-loop pressure control, said setpoint brake pressure being represented by a first electrical braking demand signal S1 that is input into the primary control connection SV1 by the primary electronic brake control device 40. For this purpose, the electronic pressure control module control unit of the pressure control module 20 comprises corresponding pressure control routines.

The solenoid valve device 82 allows electronically controlled pressurization or ventilation of the control chamber 90 and is electrically controlled by a secondary electronic brake control device 41. For this purpose, the solenoid valve device 82 is connected by way of an electrical control inlet to a secondary control connection SV2, which in this case is formed for example by a second CAN data bus.

In particular, the primary electronic brake control device 40, the electrical/electronic part of the pressure control module 20 and the braking value transmitter 86 of the service brake valve device 18 are connected to the primary control connection SV1, which is separate from and independent of the secondary control connection SV2, to which the secondary electronic brake control device 41 and the solenoid valve device 82 are connected.

In particular, a data connection 101 may be provided between the primary electronic brake control device 40 and the secondary electronic brake control device 41, in particular for an exchange of data and signals and/or for the purposes of mutual monitoring. In particular, via the data connection 101, it is also possible for the actuation signal BS and/or the first electrical braking demand signal S1 to be input into the secondary electronic brake control device 41 and/or for the second electrical braking demand signal S2 to be input into the primary electronic brake control device 40. It is not necessary for primary electronic brake control device 40 and the secondary electronic brake control device 41 to be intact for this purpose, because the signals are preferably merely looped through.

Aside from a vent 100 shown in FIG. 3, the solenoid valve device 82 preferably also has at least one pressure sensor (not shown here) for measuring the actual value of the pneumatic control pressure $p_{St}$ at the control outlet 84, such that, in conjunction with corresponding algorithms in the secondary electronic brake control device 41, to which this actual value is transmitted, closed-loop pressure control of the modulated control pressure $p_{St}$ is possible and is preferably also performed.

The secondary electronic brake control device 41 controls the solenoid valve device 82 via the secondary control connection SV2 by means of a second electrical braking demand signal S2, wherein the solenoid valve device 82 then generates the pneumatic control pressure $p_{St}$ at the control outlet 84 in accordance with the second electrical braking demand signal S2.

For example, within the solenoid valve device 82, an electropneumatic proportional valve may serve to provide a control pressure $p_{St}$, modulated (proportionally) in accordance with the second electrical braking demand signal S2, at the control outlet 84, with pressurization and ventilation likewise being possible. In a further embodiment (not illustrated here), an inlet/outlet valve combination, consisting for example of two 2/2 directional solenoid valves, may be provided, wherein the inlet valve connected to the supply inlet 83 is closed when electrically deenergized and open when electrically energized, and the outlet valve is open when electrically deenergized and closed when electrically energized. It is also possible in a further embodiment that, as a solenoid valve device 82, use is made of a 3/2 directional solenoid valve as a pressurization and ventilation valve, which has a pressurization position and a ventilation position, in combination with a 2/2 directional valve as a pressure-maintaining valve, which in its shut-off position maintains the pressure at the control outlet.

Such a solenoid valve device 82 may be used in particular in each of the above-described embodiments, in combination with a pressure sensor and with a control pressure closed-loop controller implemented in the secondary electronic brake control device 41, to control the pneumatic control pressure $p_{St}$ prevailing at the control outlet 84.

The set of equipment furthermore comprises a driver assistance system 93 such as an autopilot device or an emergency braking assistant, which can automatically generate braking demands which are then represented by an assistance braking demand signal AS, which in this case is input for example both into the primary electronic brake control device 40 and into the secondary electronic brake control device 41, as shown in FIG. 2. It would alternatively also be possible for the assistance braking demand signal AS to be input only into the secondary electronic brake control device 41. At least partially autonomous driving is possible by means of the autopilot device.

It would also be possible for routines of the driver assistance system 93 to be implemented in the primary electronic brake control device 40 and/or in the secondary electronic brake control device 41.

It is not least the case that electrical energy is supplied to the primary electronic brake control device 40 from a primary supply source 52 which is independent of a secondary supply source 58 which supplies electrical energy to the secondary electronic brake control device 41.

Figure 4:
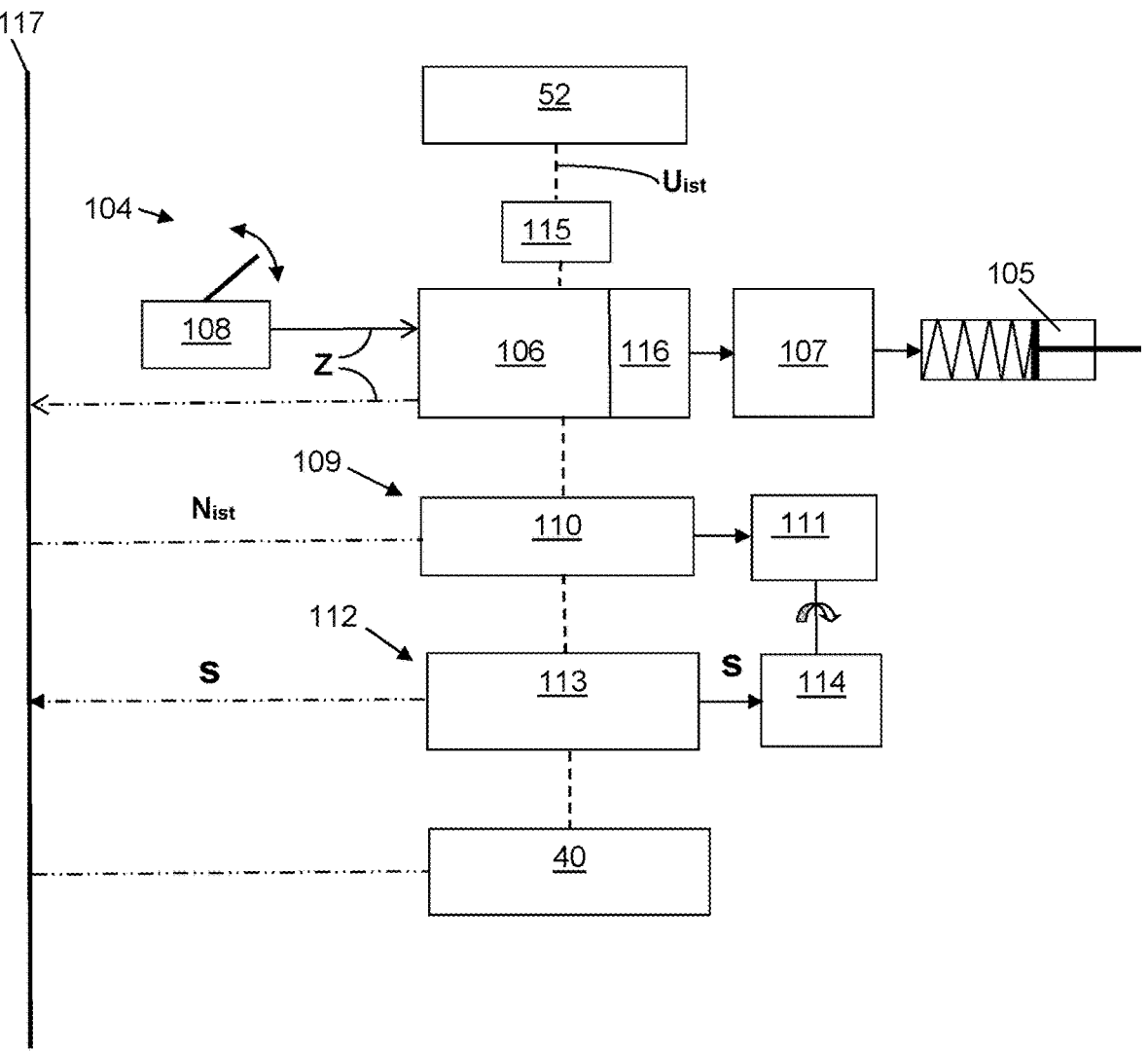
FIG. 4 is a schematic illustration of the set of equipment according to a preferred embodiment.

The set of equipment furthermore comprises an electrically actuatable parking brake device 104, which is shown schematically in FIG. 4 and which, as parking brake actuators, comprises for example passive spring brake cylinders 105 which are ventilated for application and pressurized for release. The parking brake device 104 performs at least one parking brake function and has an applied state, in which it holds the braked motor vehicle at a standstill, and a released state, in which the spring brake cylinders 105 are released. During the course of a secondary braking operation or secondary braking function in which the parking brake device 104 assists the electropneumatic service brake device 80, it is also possible for gradual braking operations to be implemented by means of the parking brake device 104.

Aside from the spring brake cylinders 105, the parking brake device 104 comprises an electronic parking brake control unit 106 and a solenoid valve device 107 that is controlled by the electronic parking brake control unit 106, wherein the parking brake control unit 106 controls the solenoid valve device 107 in order to pressurize and ventilate the spring brake cylinders 105. At the inlet side, the parking brake control unit 106 has a signal-transmitting connection to an electrical parking brake actuating element 108, for example to a multi-position pushbutton or multi-position lever, such that an actuation of the parking brake actuating element 108 causes a parking brake signal Z to be generated, with which the parking brake function and/or the secondary brake function can be triggered and the spring brake cylinders 105 can be adjusted (gradually) between released state and the applied state. Via a data interface of the parking brake control unit 106, the parking brake signal Z is also available in an CAN data bus 117. In other words, information regarding whether the parking brake device 104 is situated in the applied state or in the released state is then available on the CAN data bus 117 on the basis of the parking brake signal Z.

The set of equipment of the motor vehicle furthermore comprises a drive device 109 that has at least one active state for driving the motor vehicle and an inactive state in which the drive device 109 is shut down. Here, the drive device 109 comprises in particular an electronic drive control unit 110 and at least one drive machine 111, in this case for example an internal combustion engine and optionally additionally an electric drive, which is electrically controlled by said electronic drive control unit. Via a data interface, the drive control unit 110 may likewise be connected to the CAN data bus 117, for example in order to make available there a value for the actual engine rotational speed $N_{ist}$, which is measured by an engine rotational speed sensor that is not explicitly shown here. The drive machine 111 can be started and shut down by means of a starter device 112.

Here, the starter device 112 comprises, for example, an ignition switch 113, which is manually actuatable by the driver, and an electrical cranking motor 114, which can be activated by the ignition switch 113 for example in an "engine start" position, whereby a starting signal S for starting the drive machine 111 is generated, which starting signal activates the electrical cranking motor 114 in order to start the drive machine 111. The starting signal S therefore transfers the drive machine 111 of the drive device 109 from the inactive state into the active state.

Also provided as part of the set of equipment is, for example, a sensor device 115 by which an actual value of the supply voltage $U_{ist}$ delivered for example by the primary supply source 52 is input as a sensor signal into an electronic control device 116. In the electronic control device 116, an evaluation routine is implemented by means of which it can be determined whether or not the actual value of the supply voltage $U_{ist}$ has reached or overshot a supply voltage minimum value $U_{min}$. The sensor signal delivered by the sensor device 115 to the electronic control device 116 then preferably represents the actual value of the supply voltage $U_{ist}$, which is then compared in said electronic control device with the supply voltage minimum value $U_{min}$ . . . . The consequences of this comparison will be described in more detail further below. Said electronic control device 116 is also preferably part of the set of equipment, and is in this case integrated for example into the electronic parking brake control unit 106.

Here, the electronic parking brake control unit 106, the electronic control device 116 as part thereof, the primary electronic brake control device 40, the ignition switch 113 and optionally also the drive control unit 110 have a signal connection to one another, for example by virtue of the aforementioned devices being connected to the CAN data bus 117. The aforementioned devices can thus exchange signals and data among one another. In particular, via the CAN data bus 117, the sensor device 115 can input a sensor signal representing the current actual value of the supply voltage $U_{ist}$ into the electronic control device 116 for the purposes of evaluation or comparison with the supply voltage minimum value $U_{min}$. The parking brake signal Z is also present on the CAN data bus 117, and can in particular be identified and evaluated in the electronic control device 116. Furthermore, the electronic control device 116 may for example also control the electronic parking brake control unit 106 directly, for example in order to apply or release the parking brake device 104 or the spring brake cylinders 105 thereof.

The electronic control device 116 integrated into the electronic parking brake control unit 106 is, owing to its integrated evaluation routines, designed such that it can determine, by virtue of the starting signal S being transmitted by means of the CAN data bus 117 from the ignition switch 113 of the starter device 112, whether the drive device 109 has been transferred into the active state, that is to say whether or not the drive machine 111 has been started. Furthermore, the electronic control device 116 is also capable, on the basis of the parking brake signal Z of the parking brake device 104, which is likewise carried on the CAN data bus, of determining whether or not the parking brake device 104 is in the applied state.

Here, the primary supply source 52 supplies electrical energy for example to the primary electronic brake control device 40, to the starter device 112, to the drive device 109 and to the electrically actuatable parking brake device 104.

Against this background, a normal operating mode, a first redundancy level, a second redundancy level of the electro-pneumatic service brake device, a safety function for the starting of the drive device, and a function that prevents unnecessary switching from the normal operating mode to a redundancy level, will now be described below.

Normal Operating Mode of the Service Brake Device

Driver-Initiated Braking Operation

If the driver actuates the service brake actuating element 94 of the service brake valve device 18, which corresponds to a driver braking demand, the extent of the actuation is measured, in the intact primary electrical service brake circuit, by the two redundant braking value transmitters 86, which are preferably arranged axially in series and preferably operate contactlessly. The electrical actuation signal BS detected by the braking value transmitter 86 is generated in the electrical channel of the service brake valve device 18, is made suitable for transfer via a data bus, and is input via the primary control connection PV1 into the primary electronic brake control device 40. Since higher-level functions such as an axle-load-dependent brake force distribution are implemented in the primary electronic brake control device 40, in each case one first braking demand signal S1 is generated therein separately for the front axle VA and for the rear axle HA on the basis of the electrical actuation signal BS and is input into the relevant channel of the pressure control module 20 and into the trailer control module 24.

There, on the basis of the relevant braking demand signal S1, the brake pressure $p_{VA}$ for the front axle VA and the brake pressure $p_{HA}$ for the rear axle HA are each generated by means of the integrated solenoid valves and the relay valves and are input via the pressure control valves 28, which are for example open in this case, into the wheel brake actuators 4 in order to implement the demanded service braking operation. Analogously, the trailer control module 24, which is likewise constructed as a pressure control module, converts the first braking demand signal S1 into a trailer brake pressure $p_{Anhänger}$, which is then input via a "trailer" coupling head (not illustrated here) into any coupled-on trailer.

For example, with the brake pressure $p_{VA}$ for the front axle VA as pneumatic control pressure, the trailer control module 24 is pneumatically actuated in the secondary pneumatic brake circuit, with this pneumatic brake pressure however being retained by the integrated, electrically energized and thus closed backup valve, and therefore not being implemented.

If excessive brake slip occurs during the braking operation demanded by the driver, then the primary electronic brake control device 40, in which ABS routines are preferably implemented, controls the pressure control valves 28 (FIG. 2), which are connected to the primary control connection SV1 and to the secondary control connection SV2, in order to control the brake pressure on a wheel-specific basis until the brake slip reaches an admissible level. The same self-evidently also applies to wheel-specific open-loop/closed-loop control of the brake pressures in the context of driving dynamics control ESP.

In parallel with this, in the case of the driver-imparted braking demand, in the secondary pneumatic service brake circuit or in the two pneumatic channels of the service brake valve device 18, the plunger piston 91 is pushed downward, wherein the plunger piston 91 is forced against the base of the cup-shaped sleeve 103, and the control piston 85 is likewise pushed downward, until the outlet seat seals against the valve body and therefore the connection between the control outlets 16, 17 for the pneumatic service brake circuits and the ventilation port 99 closes, such that no further ventilation of the associated wheel brake actuators 4 is possible.

If the service brake actuating element 94 is actuated to a further increased extent in response to the driver braking demand, then the valve body, with the outlet seat bearing against it, is forced downward so as to lift off from the inlet seat. Compressed air at reservoir pressure thus passes from the reservoir chamber 89 into the working chamber 98 and from there into the control outlets 16, 17 for the pneumatic service brake circuits and into the associated wheel brake actuators 4, in order to pressurize and thus apply these. This is a purely driver-initiated braking operation, in which, owing to the actuating force exerted on the service brake actuating element 94 by the driver in accordance with the driver braking demand, a first actuating force F1 is exerted on the control piston 85 by means of the plunger piston compression spring 102, which ultimately adjusts said control piston into its pressurization position.

In the case of such a braking operation initiated purely by a driver braking demand, the solenoid valve device 82 is adjusted by means of the secondary electronic brake control device 41 into the ventilation position, in which the control chamber 90 is connected to the atmosphere, in order to avoid pressure effects that could arise as a result of the expansion of the control chamber 90. The secondary electronic brake control device 41 receives the command for this for example via the data connection 101 from the primary electronic brake control device 41.

Since the primary electrical service brake circuit is however intact, the first and second brake control pressures p1 and p2, which prevail at the control outlets 16, 17 and which are input via the control lines 22, 23 into the pneumatic control inlets 95, 96 of the pressure control module 20, are retained at the then electrically energized and accordingly closed backup valves in the pressure control module 20, and are not transmitted onward to the integrated relay valves.

Thus, when the primary electrical service brake circuit is intact, the secondary and redundant pneumatic service brake circuit has no effect.

Automatic/Autonomous Braking Operation

Below, the case will now be considered in which the driver does not impart a braking demand and therefore does not operate the service brake actuating element 94, but the driver assistance system 93 inputs an assistance braking demand signal AS into both the primary electronic brake control device 40 and into the secondary electronic brake control device 41, as indicated in FIG. 2.

Here, the primary electronic brake control device 40 may generate, on the basis of the assistance braking demand signal AS, a first electrical braking demand signal S1 which is then converted, in the electrical service brake circuit, as described above, by means of the pressure control module 20 and the trailer control module 24 into corresponding brake pressures $p_{VA}$, $p_{HA}$ and $p_{Anhänger}$ The assistance braking demand signal AS is consequently then implemented by the intact electrical service brake circuit or the intact pressure control module 20.

In parallel or simultaneously with this, the secondary electronic brake control device 41 generates, on the basis of the assistance braking demand signal AS, the second electrical braking demand signal S2, which is input via the secondary control connection SV2 into the solenoid valve device 82, which is thereupon adjusted into the pressurization position and thus generates the pneumatic control pressure $p_{St}$, with which the control chamber 90 is pressurized. The control pressure $p_{St}$ that then prevails in the control chamber 90 acts on the plunger piston 91, which delimits said control chamber, and thus on the service brake actuating element 94, and this is perceptible to the driver via their foot if this is in contact with the service brake actuating element 94 (pedal feedback). An initiation of an automatic braking operation is thus perceptible to the driver via their foot. Depending on the modulation of the pneumatic control pressure $p_{St}$ that is input into the control chamber 90, it is then possible to set a defined second actuating force F2 on the control piston 85. The second actuating force F2, which preferably acts on the control piston 85 in parallel with respect to and in the same direction as the first actuating force F1, serves, as described above with regard to the first actuating force F1, to generate the first and the second pneumatic brake control pressure p1, p2, which, via the control outlets 16, 17 and the control lines 22, 23, are input into the pressure control module 20. There, the first and the second pneumatic brake control pressure p1, p2 are however retained by the backup valves that are electrically energized by the primary electronic brake control device 40 and thus closed, and said first and second pneumatic brake control pressures therefore (initially) have no effect. However, the first and the second pneumatic brake control pressure b1, p2 can act immediately on the integrated relay valves in the pressure control module 20 if, owing to a defect in the electrical service brake circuit, the backup valves are electrically deenergized and thus opened. Such a defect may for example result in a drop in the supply voltage of the primary supply source 52, such that the primary electronic brake control device 40 is undersupplied with voltage and can no longer perform the service brake function.

Combination of Driver-Initiated Braking Operation and Autonomous/Automatic Braking Operation A situation is furthermore also conceivable in which braking should be performed both in response to a driver braking demand and in response to an automatically generated braking demand, for example if the driver does brake owing to an emergency braking situation but the braking demand from the driver assistance system, for example in the form of an emergency braking assistant or an autopilot device, is greater than the braking demand from the driver.

The brake pressures $p_{VA}$ and $p_{HA}$ are then generated in the electrical service brake circuit, which is controlled by the primary electronic brake control device 40, primarily on the basis of the assistance braking demand signal AS. In other words, in the primary electrical service brake circuit, the braking demand from the driver is overwritten by the braking demand from the driver assistance system.

In parallel with this, the first actuating force F1 from the driver braking demand and the second actuating force F2 from the automatically generated braking demand act in the same direction and in parallel on the control piston 85 of the service brake valve device 18, wherein the actuating forces F1, F2 are added together at the control piston 85, and the first pneumatic brake control pressure p1 and the second pneumatic brake control pressure p2 are then modulated at the control outlets 16, 17, via the control lines 22, 23, into the pneumatic control inlets 95, 96 of the pressure control module 20, but are retained there by the backup valves that are electrically energized by the primary electronic brake control device 40.

First Redundancy Level

If a defect or fault now occurs in the primary electrical service brake circuit, be it because the primary electronic brake control device 40 and/or the electrical/electronic part of the pressure control module 20 has a defect or has failed and/or the primary supply source 52 is delivering no supply voltage U or an excessively low supply voltage U (for example briefly owing to an actuation of the starter device 112), then the two backup valves integrated in the pressure control module 20 are electrically deenergized and thus switch into their open position, whereby, in the event of a braking demand from the driver assistance system 93, that is to say following a generation of the second electrical braking demand signal S2, the first and second brake control pressures p1, p2 that are then already prevailing at said backup valves can control the associated integrated relay valve, whereby the brake pressure $p_{VA}$ for the front axle VA and the brake pressure $p_{HA}$ for the rear axle HA can be generated. Since it is for example the case here that the brake pressure $p_{VA}$ for the front axle is used as a pneumatic control pressure for the trailer control module 24, the trailer brake pressure $p_{Anhänger}$ can also be generated, such that any trailer that is coupled on can also be braked.

Therefore, in the first redundancy level, it is assumed that the secondary electronic brake controller 40 is intact, because it is otherwise not possible for a second electrical brake demand signal S2 to be generated or for the first and second pneumatic brake control pressures p1 and p2 to be generated on the basis thereof.

For wheel-specific adjustment of the brake pressures $p_{VA}$ and $p_{HA}$, for example in the context of brake slip control ABS, drive slip control ASR and/or driving dynamics control ESP, the intact secondary electronic brake controller 41 can actuate the pressure control valves 28 individually via the secondary control connection SV2 ("maintaining pressure", "lowering pressure", "increasing pressure").

Therefore, in the first redundancy level, if the electrical service brake circuit has failed, electrical redundancy exists owing to the first and second pneumatic brake control pressures p1 and p2 in the first and second pneumatic brake circuits that are then in effect, because then the first and second pneumatic brake control pressures p1 and p2 are generated electrically and automatically by means of the secondary electronic brake controller 40.

Furthermore, if the electrical service brake circuit has failed, an automatic braking demand is implemented by means of the first and second pneumatic brake control pressures p1 and p2 in the first and second pneumatic brake circuits that are then likewise in effect, wherein, if the electrical service brake circuit has failed, the first and second brake control pressures p1 and p2 can then take effect immediately because they have already been generated in response to the assistance braking demand signal AS and are then also already prevailing at the backup valves of the pressure control module 20.

Second Redundancy Level

If, proceeding from the state of the electropneumatic service brake device 18 in the first redundancy level, that is to say if the primary electronic brake control device 40 has a defect or fault and/or the primary supply source 52 is delivering no supply voltage or an excessively low supply voltage (for example briefly owing to an actuation of the starter device 112), a defect or fault then also occurs in the control of the pneumatic service brake circuit by the secondary electronic brake control device 41 and the solenoid valve device 82 and/or the redundancy supply source 58 is delivering no supply voltage or an excessively low supply voltage, then the first and the second pneumatic brake control pressure p1 and p2 can no longer be generated electrically, such that autonomous or automatic braking operation by the driver assistance system 93 is then also no longer possible.

The pneumatic service brake circuit can then be controlled only by the braking demands from the driver and the then mechanically generated first and second pneumatic brake control pressures p1 and p2. Since the backup valves in the pressure control module 20 are then electrically deenergized and consequently switched into their pass-through position, the first and the second pneumatic brake control pressure p1 and p2 cause the brake pressure $p_{VA}$ for the front axle and the brake pressure $p_{HA}$ for the rear axle HA to be generated in the pressure control module 20. Since it is preferably the case here that the brake pressure $p_{VA}$ for the front axle VA is used as a pneumatic control pressure for the trailer control module 24, the trailer brake pressure $p_{Anhänger}$ can also be generated, such that any trailer that is coupled to the vehicle can also be braked.

However, the failure of all of the electrical service brake circuits means that pressure control is no longer possible, nor can the pressure control valves 28 be actuated, such that the brake pressures $p_{VA}$ and $p_{HA}$ can no longer be controlled on a wheel-specific basis.

As described above, the electropneumatic service brake device 80 and in particular the secondary electronic brake control device 41 (through corresponding programming), the solenoid valve device 82 and the service brake valve device 18 are therefore designed such that the first and second pneumatic brake control pressures p1 and p2 are generated for example in response to any automatically generated assistance braking demand signal AS that represents an autonomous or automatic braking demand, and then prevail without a delay and directly at the electromagnetic backup valve, which is (still) closed owing to electrical energization, of the pressure control module 20.

Irrespective of whether a driver-initiated braking operation and/or an automatic braking operation is demanded, it is therefore always the case that the first pneumatic brake control pressure p1 and the second pneumatic brake control pressure p2 are already prevailing in the pressure control module 20 and can therefore serve for generating the brake pressures $p_{VA}$, $p_{HA}$ and $p_{Anhänger}$ immediately following the failure of the electrical service brake circuit.

To nevertheless reduce the wear to the solenoid valve device 82 and to the service brake valve device 18, which as described above are actually activated upon every autonomous or automatic braking demand, and in order to also reduce the acoustic impact resulting therefrom, the pneumatic control pressure $p_{St}$ and/or the first and second pneumatic brake control pressures p1 and p2 are preferably generated electrically only if the level of the automatic or autonomous braking demand represented by the assistance braking demand signal AS is higher than the level of a threshold braking demand $a_{grenz}$. This limitation may be implemented for example through corresponding programming of the secondary electronic brake control device 41.

It is therefore preferable if the threshold braking demand $a_{grenz}$ is or represents a non-zero deceleration, for example $-3$ m/s$^2$. First and second pneumatic brake control pressures p1 and p2 would therefore be generated electrically if, for example, an automatic or autonomous braking demand (deceleration) of $-4$ m/s$^2$ were demanded, but would not be generated electrically in the case of an automatic or autonomous braking demand (deceleration) of only $-2$ m/s$^2$.

The threshold braking demand $a_{grenz}$ may however alternatively also be equal to zero, wherein the first and second pneumatic brake control pressures p1 and p2 are generated electrically in the case of any demanded autonomous or automatic braking operation for which the level of the braking demand is greater than zero.

It is also possible for the first and second pneumatic brake control pressures p1 and p2 to be generated on the basis of at least the following variables and input into the pneumatic control inlets 95, 96 of the pressure control module 20:

a) a mass ratio between the towing vehicle and the trailer, b) the axle loads of the rear axle HA and of the front axle VA, c) the number of pneumatic channels of the service brake valve device.

Safety Function for the Starting of the Drive Device

A safety function is provided for the starting of the drive device 109 proceeding from a state in which, when the motor vehicle is at a standstill and parked, the parking brake device 104 is in the applied state (that is to say the spring brake cylinders 105 are ventilated) and the drive device 109 is in the inactive state, that is to say the drive machine 111 is shut down. The fact that the motor vehicle is at a standstill can be determined for example on the basis of signals from wheel rotational speed sensors, the rotational speed signals from which are then likewise input into the signal connection 117 in order that they can be read and evaluated by the electronic control device 116. The safety function is preferably implemented as software in the electronic control device 116.

The electronic control device 116 is designed to be able to determine for example with the aid of the signal connection 117 whether the parking brake device 104 is in the applied state, optionally the drive device 109 is in the inactive state, and the starter device 112 has generated the starting signal S. If this is the case, then the electronic control device 116 keeps the parking brake device 104 in the applied state for as long as the actual value $U_{ist}$ for the electrical supply voltage $U_{ist}$, in this case for example of the primary supply source 52, has not reached or overshot a supply voltage minimum value $U_{min}$.

The purpose or effect of the safety function is that, in the event that the primary electronic brake control device 40 is undersupplied with supply voltage U by the primary supply source 52 and is then not functional, the fact that the parking brake device 104 then continues to be kept in the applied state means that the motor vehicle is then prevented from being able to unintentionally roll away if the driver, for example failing to pay attention, does not intervene; the safety of the motor vehicle is thus increased. If the primary electronic brake control device 40 were not functional, then a switch would in fact be made from the normal operating mode to the first redundancy level; it is however sought to prevent this for reasons described further below.

When the electrical supply voltage U has then (again) reached or overshot the supply voltage minimum value $U_{min}$, in this case for example of the primary supply source 52, in particular shortly after the starting of the drive device 109, the service brake device 80 is fully functional again, such that the parking brake device 104 is then switched from the applied state into the released state, and the motor vehicle can commence driving.

In other words, the electronic control device 116 is designed such that, if the starter device 112 has generated the starting signal S and the parking brake device 104 is in the applied state, in particular when the motor vehicle is at a standstill, the parking brake device 104 is transferred from the applied state into the released state if said electronic control device has determined for example with the aid of the signal connection 117 that the actual value for the electrical supply voltage $U_{ist}$ has overshot the supply voltage minimum value $U_{min}$ in particular for at least the duration of a predetermined first time period $\Delta t_1$, for example for at least 2 seconds. It is then to be assumed that the supply voltage U is stable again and no longer falls below the supply voltage minimum value $U_{min}$.

Prevention of Unnecessary Switching to Redundancy

If, as described above, the supply voltage U briefly falls below the supply voltage minimum value $U_{min}$ owing to an actuation of the starter device 112 upon the starting of the motor vehicle proceeding from the parked state, this would in fact constitute a switching criterion resulting in the service brake device 80 being switched from the normal operating mode to the first redundancy level.

It is however to be expected that, shortly after the starting operation, the actual value of the supply voltage $U_{ist}$ returns to being equal to or higher than the supply voltage minimum value $U_{min}$. In such case, a switch from the normal operating mode to the first redundancy level or from the primary service brake circuit to the redundant service brake circuit, and a degradation of the service brake function(s) that is under certain circumstances associated with such a switch, would not be necessary, because then, after the short period of time of the starting operation and of the associated drop in the supply voltage, the supply voltage U returns to being high enough to be able to fully perform the service brake function(s) of the primary service brake circuit unimpaired in the normal operating mode.

Therefore, the electronic control device 116 is preferably designed to prevent, in response to the switching criterion coming into effect, a switch of the performance of the service brake function(s) from the normal operating mode or from the primary service brake circuit to the first redundancy level or to the redundant service brake circuit, and to disregard the switching criterion if the actual value for the supply voltage $U_{ist}$, or the physical variable representing the actual value, is lower than the supply voltage minimum value $U_{min}$ for at most the duration of a predetermined second period of time $\Delta t_2$. For example, the predetermined second period of time $\Delta t_2$ may begin upon the generation of the starting signal S by the starter device 112 at the time to.

LIST OF REFERENCE SIGNS

1 Wheel
2 Axle
3 Disk brake
4 Wheel brake actuator
10 Compressed-air reservoir
13 Control line
14 Supply line
14a Supply line
14b Supply line
14c Supply line
15 Supply inlet (footbrake module)
16 Control outlet (footbrake module, interface for front axle and trailer)
17 Control outlet (footbrake module, interface for rear axle)
18 Service brake valve device
19 Control inlet, footbrake module
20 Pressure control module
22 Control line (for front axle and trailer module 24)
23 Control line (for rear axle)
24 Trailer control module
26 Line
27 Line
28 Pressure control valve
29 Brake line
40 Primary electronic brake control device
41 Secondary electronic brake control device
50 Brake line (to the trailer)
52 Primary supply source
58 Secondary supply source
80 Electropneumatic service brake device
82 Solenoid valve device
83 Supply inlet (solenoid valve device)
84 Control outlet (solenoid valve device)
85 Control piston
86 Braking value transmitter
87 Plunger piston rod
88 Double seat valve
89 Reservoir chamber
90 Control chamber
91 Plunger piston
92 Plunger receptacle
93 Driver assistance system
94 Service brake actuating element
95 Pneumatic control inlet
96 Pneumatic control inlet
97 Electrical control inlet
98 Working chamber
99 Ventilation port
100 Vent
101 Data connection
102 Plunger piston compression spring
103 Sleeve

US 12,691,860 B2

21

104 Parking brake device
105 Spring brake cylinder
106 Parking brake control unit
107 Solenoid valve device
108 Parking brake actuating element
109 Drive device
110 Drive control unit
111 Drive machine
112 Starter device
113 Ignition switch
114 Cranking motor
115 Sensor device
116 Electronic control device
117 CAN data bus
SV1 (Electronic) primary control connection
SV2 (Electronic) secondary control connection
HA Rear axle
VA Front axle
BS Electrical actuation signal
AS Assistance braking demand signal
F1 First force
F2 Second force
S1 First electrical braking demand signal
S2 Second electrical braking demand signal
p1 First pneumatic brake control pressure
p2 Second pneumatic brake control pressure
$p_{St}$ Pneumatic control pressure
$p_{VA}$ Brake pressure, front axle
$p_{HA}$ Brake pressure, rear axle
pAnhänger Trailer brake pressure
$U_{ist}$ Actual supply voltage
$U_{min}$ Supply voltage minimum value
S Starting signal
Z Parking brake signal
The invention claimed is:

1. A system for a partially autonomously or autonomously operated motor vehicle, comprising:
  a) an electrically actuatable service brake device that performs at least one service brake function,
  b) an electrically actuatable parking brake device that performs at least one parking brake function and has at least one applied state and a released state,
  c) a drive device that has at least one active state for driving the motor vehicle and an inactive state in which the drive device is shut down,
  d) a starter device which generates a starting signal which transfers the drive device from the inactive state into the active state, and
  e) an electrical energy source which supplies electrical energy to at least the electrically actuatable service brake device and the starter device, characterized in that
  f) an electronic control device is provided which has a signal connection to at least the parking brake device and the starter device and which receives from a sensor device an actual value for an electrical supply voltage or a physical variable, representing said actual value, of the electrical energy source, wherein
  g) the electronic control device is designed to be able to determine with the aid of the signal connection whether the parking brake device is in the applied state and the starter device has generated the starting signal, and if this is the case, the electronic control device keeps the parking brake device in the applied state for as long as the actual value for the electrical supply voltage, or the physical variable representing said actual value, has not reached or overshot a supply voltage minimum value.

2. The system as in claim 1, characterized in that the electronic control device is configured to keep the parking brake in the applied state for as long as the actual value for the electrical supply voltage, or the physical variable representing said actual value, has not reached or overshot the supply voltage minimum value in particular for at least the duration of a predetermined first period of time, wherein the predetermined first period of time begins upon the generation of the starting signal.

3. The system as in claim 1, characterized in that the electronic control device is designed to transfer the parking brake device from the applied state into the released state when it has determined in particular with the aid of the signal connection that the actual value for the electrical supply voltage, or the physical variable representing said actual value, has overshot the supply voltage minimum value in particular for at least the duration of a first predetermined period of time, wherein the predetermined first period of time preferably begins upon the generation of the starting signal.

4. The system as in claim 1, characterized in that the sensor device is connected to the signal connection.

5. The system as in claim 1, characterized in that the electrically actuatable service brake device comprises a primary service brake circuit and at least one redundant service brake circuit as redundancy for the primary service brake circuit, wherein the electrically actuatable service brake device is designed such that, in the normal state, the primary service brake circuit performs the service brake function, but in response to a switching criterion, the performance of at least a part of the service brake function switches from the primary service brake circuit to the redundant service brake circuit.

6. The system as in claim 5, characterized in that the switching criterion comprises the event in which the actual value for the supply voltage, or the physical variable representing said actual value, is lower than the supply voltage minimum value.

7. The system as in claim 6, characterized in that the electronic control device is designed to prevent, in response to the switching criterion coming into effect, a switch of the performance of the service brake function from the primary service brake circuit to the redundant service brake circuit, and to disregard the switching criterion if the actual value for the supply voltage, or the physical variable representing said actual value, is lower than the supply voltage minimum value for at most the duration of a predetermined second period of time.

8. The system as in claim 7, characterized in that the predetermined second period of time begins upon the generation of the starting signal.

9. The system as in claim 1, characterized in that the electronic control device is integrated in a service brake control unit for controlling the service brake device, in a parking brake control unit for controlling the parking brake device, and/or in a control unit for partially autonomously or autonomously controlling the motor vehicle.

10. The system as in claim 1, characterized in that the signal connection comprises at least one controller area network.

11. The system as in claim 1, characterized in that the starter device that generates the starting signal comprises:
  a) a control unit for partially autonomously or autonomously controlling the motor vehicle, and/or
  b) an ignition switch, which can be a manually operated by a driver of the motor vehicle, of an ignition system of the motor vehicle.

12. The system as in claim 1, characterized in that the electrical energy source supplies electrical energy to the electrically actuatable parking brake device and/or to the electronic control device.

13. The system as in claim 1, characterized in that the electrically actuatable parking brake device comprises, as a parking brake actuator, at least one spring brake cylinder which is applied when ventilated and released when pressurized.

14. The system as in claim 1, characterized in that electrical energy is supplied to the electronic control device by a secondary energy source which is additional to and independent of the electrical energy source.

15. A partially autonomously or autonomously operated motor vehicle comprising the system of claim 1.

* * * * *